US008391852B2

United States Patent
Tachikawa

(10) Patent No.: US 8,391,852 B2
(45) Date of Patent: Mar. 5, 2013

(54) COMMUNICATION METHOD, COMMUNICATION SYSTEM, COMMUNICATION TERMINAL APPARATUS AND BASE STATION APPARATUS

(75) Inventor: Hitoya Tachikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 355 days.

(21) Appl. No.: 12/528,592

(22) PCT Filed: Feb. 26, 2008

(86) PCT No.: PCT/JP2008/053277
§ 371 (c)(1),
(2), (4) Date: Nov. 18, 2009

(87) PCT Pub. No.: WO2008/105402
PCT Pub. Date: Sep. 4, 2008

(65) Prior Publication Data
US 2010/0056126 A1    Mar. 4, 2010

(30) Foreign Application Priority Data

Feb. 26, 2007  (JP) ................................. 2007-045802
May 29, 2007   (JP) ................................. 2007-141634

(51) Int. Cl.
*H04M 3/00*    (2006.01)
(52) U.S. Cl. ......... 455/418; 455/518; 455/519; 455/574
(58) Field of Classification Search .................. 455/418, 455/518, 519, 574
See application file for complete search history.

(56) References Cited

U.S. PATENT DOCUMENTS

| | | | |
|---|---|---|---|
| 6,449,491 B1* | 9/2002 | Dailey | 455/518 |
| 7,142,882 B2* | 11/2006 | Schmidt | 455/552.1 |
| 7,457,612 B2 | 11/2008 | Kurokawa et al. | 455/412.1 |
| 7,590,403 B1* | 9/2009 | House et al. | 455/343.2 |
| 2002/0173326 A1* | 11/2002 | Rosen et al. | 455/518 |
| 2004/0097268 A1 | 5/2004 | Kurokawa et al. | 455/561 |
| 2004/0121791 A1* | 6/2004 | May et al. | 455/519 |
| 2004/0266468 A1* | 12/2004 | Brown et al. | 455/518 |
| 2005/0188195 A1* | 8/2005 | Choi et al. | 713/155 |
| 2006/0030305 A1* | 2/2006 | Lee et al. | 455/418 |

FOREIGN PATENT DOCUMENTS

| | | |
|---|---|---|
| JP | 2003-229800 | 8/2003 |
| JP | 2004-007187 | 1/2004 |
| JP | 2004-172772 | 6/2004 |
| JP | 2006-319510 | 11/2006 |

* cited by examiner

*Primary Examiner* — Charles Shedrick
(74) *Attorney, Agent, or Firm* — DLA Piper LLP (US)

(57) ABSTRACT

A BS 11 recognizes states of a first session and a second session and instructs an MS 12 to change a state of the first session via the second session when the BS 11 receives data for the first session from a network while the first session is in the sleep state and the second session is in the active state. When the MS 12 changes the first session to be in the active state before a lapse of predetermined time interval when receiving the instruction from the BS 11, the BS 11 transmits the data for the first session to the MS 12 via the first session changed to be in the active state.

10 Claims, 7 Drawing Sheets

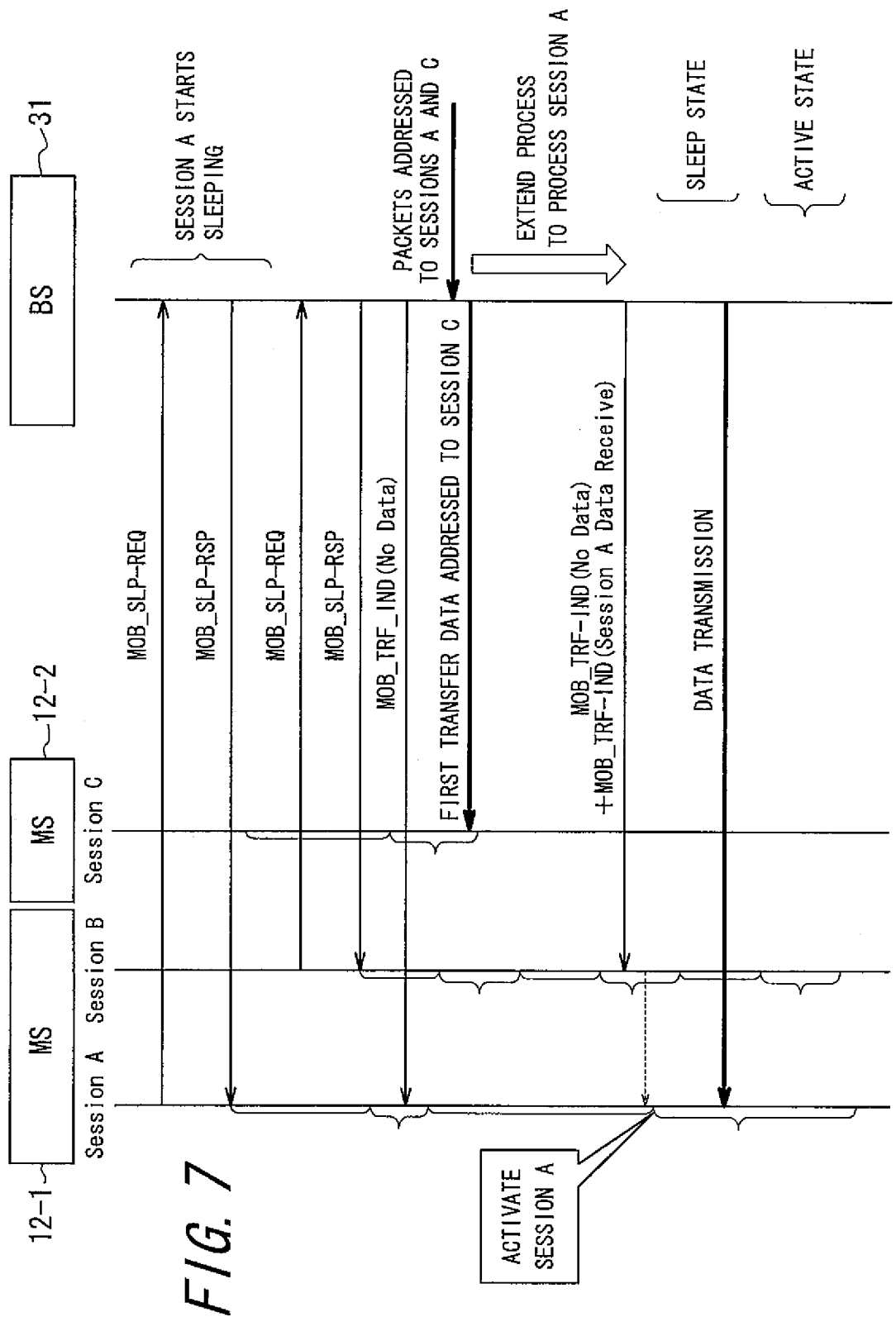

COMMUNICATION METHOD, COMMUNICATION SYSTEM, COMMUNICATION TERMINAL APPARATUS AND BASE STATION APPARATUS

CROSS REFERENCE TO RELATED APPLICATION

This application is a national stage of international application No. PCT/JP2008/053277 filed on Feb. 26, 2008, which also claims priority to and the benefit of Japanese Patent Application No. 2007-045802 filed Feb. 26, 2007 and Japanese Patent Application No. 2007-141634 filed May 29 2007, the entire contents of those are incorporated herein by reference.

TECHNICAL FIELD

The present invention relates to a communication method and a communication system capable of communicating in a plurality of sessions between a communication terminal apparatus and a base station apparatus, and to the communication terminal apparatus and the base station apparatus used for the communication system.

BACKGROUND ART

As a communication system for communication between a communication terminal apparatus and a base station apparatus, disclosed in Patent Document 1 is a communication system to control power supply in a relay apparatus (base station, station) having a plurality of interfaces. In the case of controlling power supply in a relay apparatus having a plurality of interfaces, although a wired interface (IEEE (Institute Electrical and Electronics Engineers) 1394) and a wireless interface of the relay apparatus of the conventional art have a wired standby means and a wireless standby means respectively, there is no comprehensive power control method and thus controlling the power supply may cause waste of standby power and inefficiency in power management to shift to and recovery from a power save mode. In order to solve such a problem, the communication system disclosed in Patent Document 1 recovers one relay apparatus in a standby state in the power save mode by transmitting a recovery instruction to the relay apparatus from the other relay apparatus.

Further, disclosed in Patent Document 2 is a communication system to call a mobile terminal using different communication systems of PHS (Personal Handyphone System) and a wireless LAN (Local Area Network) of IEEE802.11b standard by use of PHS paging function that requires less power consumption, when the wireless LAN is not enabled. This communication system disclosed in Patent Document 2 reduces power consumption of the mobile terminal by performing paging with the PHS.

In addition, Patent Document 3 discloses a communication system in which, when a multimedia terminal apparatus transmits a packet signal to a wireless mobile terminal in power save mode via a wireless base station, the wireless base station temporarily stores the packet signal, and transmits broadcast information to the wireless mobile terminal by periods. Then the wireless mobile terminal in power save mode analyzes the broadcast information, thus knows whether the packet signal addressed to the own terminal is temporarily stored in the wireless base station and requires transmission of the packet signal to the wireless base station if stored.

In the communication system disclosed in Patent Document 3, the wireless mobile terminal determines whether realtime communication is necessary based on a protocol part of a packet signal when receiving the packet signal that the wireless mobile terminal has requested to transmit from the wireless base station. When it is determined that the realtime communication is necessary, the wireless mobile terminal notifies the wireless base station of its shift from the power save mode to a normal mode, and notifies the wireless base station of its recovery to the power save mode when the realtime communication is finished.

Incidentally, a sleep mode is defined for a mobile terminal in IEEE802.16-2005. In the sleep mode the mobile terminal apparatus turns off the power supply to the wireless circuit unit intermittently to save the power. In addition, unlike the mobile terminal apparatuses of the conventional arts, the mobile terminal apparatus in conformity with IEEE802.16 standard can establish a plurality of logical connections with a single base station.

Patent Document 1: Japanese Patent Laid-Open Publication No. 2004-007187
Patent Document 2: Japanese Patent Laid-Open Publication No. 2003-229800
Patent Document 3: Japanese Patent Laid-Open Publication No. 2004-172772

SUMMARY OF INVENTION

Technical Problem

Although IEEE802.016-2005 defines a method of saving power in each connection but does not define a method of recovering a dormant connection in cooperation with another connection when a plurality of connections are established with a single base station. Thus, when the base station attempts to transmit data to a mobile terminal apparatus but the connection with the mobile terminal apparatus is dormant as the mobile terminal apparatus is in the sleep mode, the base station stores the data temporarily until recovery of the connection or, in case of having no buffer space available, discards the data.

That is, because the mobile terminal apparatus receives wireless signals intermittently, it can not transmit data to one connection during communication with another connection when the connection is dormant. It is thus necessary for the base station to store the data until recovery of the connection, and the data is discarded if the amount of the stored data increases, which leads to delay of data transmission in the base station.

Moreover, when the base station stores the data until the recovery of the connection, if it stores data of the prioritized service type, the base station may not be able to maintain stable service quality in realtime communication.

It is an object of the present invention to provide a communication method, a communication system, a communication terminal apparatus and a base station apparatus that are capable of maintaining stable service quality in realtime communication by reducing burden on a base station to hold data when communicating with a plurality of connections (sessions) so as to prevent delay of data transmission in the base station and enable a realtime communication of the data of the prioritized service type.

Solution to Problem

In order to achieve the object set forth above, a communication method in accordance with the present invention is for a communication system capable of communicating between a communication terminal apparatus and a base station apparatus at least in a first session and a second session, wherein the first session has a period in which the first session is shifted to an active state or a sleep state alternately at predetermined intervals and the second session has a period in which the second session is at least in the active state when the first session is in the sleep state, and the communication method includes:

a session state recognizing step at which the base station apparatus recognizes states of the first session and the second session;

an instructing step at which the base station apparatus gives an instruction to the communication terminal apparatus to change a state of the first session via the second session when the base station apparatus obtains data for the first session from a network while the first session is in the sleep state and the second session is in the active state based on the recognition;

a session state changing step at which the communication terminal apparatus changes the first session to be in the active state when receiving the instruction even before a lapse of the predetermined time interval; and a data transmitting step at which the base station apparatus transmits the data for the first session to the communication terminal apparatus via the first session changed to be in the active state.

It is preferred to instruct the communication terminal apparatus to change a state of the first session via the second session in the instructing step when the base station apparatus obtains data for realtime communication for the first session from the network.

It is also preferred for the second session to have a period in which the second session is shifted to an active state or a sleep state alternately at predetermined time intervals, and it is preferred to recognize states of the first session and the second session either in the active state or in the sleep state in the session state recognizing step.

It is also preferred that the communication method further includes:

a priority recognizing step at which the base station apparatus recognizes priorities of the first session and a third session when obtaining at least data for the first session and data for the third session different from the first session and the second session;

a priority comparing step at which the base station apparatus compares each of the recognized priorities; and a controlling step at which the base station apparatus controls so as to transmit the data for the third session preferentially via the third session when higher priority is placed on the third session as a result of the comparison, wherein it is preferred that the steps subsequent to the session state recognizing step are executed after the data for the third session is transmitted.

It is also preferred, when communication terminal apparatuses used for the first session and for the third session are different from each other, in the priority recognizing step to recognize priority of the communication terminal apparatus communicating in each session, and in the controlling step to control so as to transmit the data for the third session preferentially via the third session when higher priority is placed on the communication terminal apparatus communicating in the third session as a result of comparison in the priority comparing step.

A communication system in accordance with the present invention is capable of communicating between a communication terminal apparatus and a base station apparatus at least in a first session and a second session, the communication terminal apparatus includes:

a controlling unit for controlling session states so that the first session has a period in which the first session is shifted to an active state or a sleep state alternately at predetermined time intervals and that the second session has a period in which the second session is at least in the active state when the first session is in the sleep state, the base station apparatus includes:

a session state recognizing unit for recognizing states of the first session and the second session;

a data obtaining unit for obtaining data for the first session from a network;

an instructing unit for giving an instruction to the communication terminal apparatus to change a state of the first session via the second session when the data obtaining unit obtains data for the first session while the first session is in the sleep state and the second session is in the active state based on recognition by the session state recognizing unit, wherein the controlling unit of the communication terminal apparatus controls a state of the first session to be changed to the active state based on the instruction even before a lapse of the predetermined time interval, and the base station apparatus further includes a data transmitting unit for transmitting the data for the first session via the first session changed to be in the active state.

It is preferred that the base station apparatus further includes:

a priority recognizing unit for recognizing priorities of the first session and a third session when at least data for the third session different from the first session and the second session are obtained together with data for the first session from a network by the data obtaining unit;

a priority comparing unit for comparing priority of each session recognized; and a controlling unit for controlling so as to transmit the data for the third session preferentially via the third session when the priority is placed on the third session as a result of the comparison.

A communication terminal apparatus in accordance with the present invention capable of communicating with a base station apparatus at least in a first session and a second session includes:

a controlling unit for controlling session states so that the first session has a period in which the first session is shifted to an active state or a sleep state alternately at predetermined time intervals and that the second session has a period in which the second session is to be at least in the active state when the first session is in the sleep state; and an instruction obtaining unit for obtaining an instruction indicating a message to change a state of the first session from the base station apparatus when the first session is in the sleep state and the second session is in the active state, wherein the controlling unit controls a state of the first session to be changed to the active state based on the instruction even before a lapse of the predetermined time interval.

A base station apparatus in accordance with the present invention capable of communicating with a communication terminal apparatus at least in a first session and a second session includes:

a session state recognizing unit for recognizing states of the first session and the second session;

a data obtaining unit for obtaining data for the first session from a network;

an instructing unit for giving an instruction to the communication terminal apparatus to change a state of the first session via the second session when the data obtaining unit obtains the data for the first session while the first session is in a sleep state and the second session is in an active state according to recognition by the session state recognizing unit; and a data transmitting unit for transmitting the data for the first session to the communication terminal apparatus via the first session after the instruction.

It is preferred that the base station apparatus in accordance with the present invention further includes:

a priority recognizing unit for recognizing priorities of the first session and a third session when the data obtaining unit obtains at least data for the third session different from the first session and the second session together with data for the first session from a network;

a priority comparing unit for comparing each of the recognized priorities; and a controlling unit for controlling so as to transmit the data for the third session preferentially via the third session when priority is placed on the third session as a result of the comparison.

Effect of the Invention

According to the present invention, the burden of data holding in the base station apparatus can be reduced during communication with a plurality of sessions, and thus it is possible to prevent delay of data transmission in the base station apparatus. Moreover, since it enables realtime communication of data of the prioritized service type, stable service quality can be maintained in realtime communication.

BRIEF DESCRIPTION OF DRAWINGS

FIG. 7 is a sequence diagram illustrating data transmission by a communication method of the communication system in accordance with the second embodiment.

DESCRIPTION OF EMBODIMENTS

Preferred embodiments of the present invention now will be described referring to the accompanying drawings.

Figure 1:
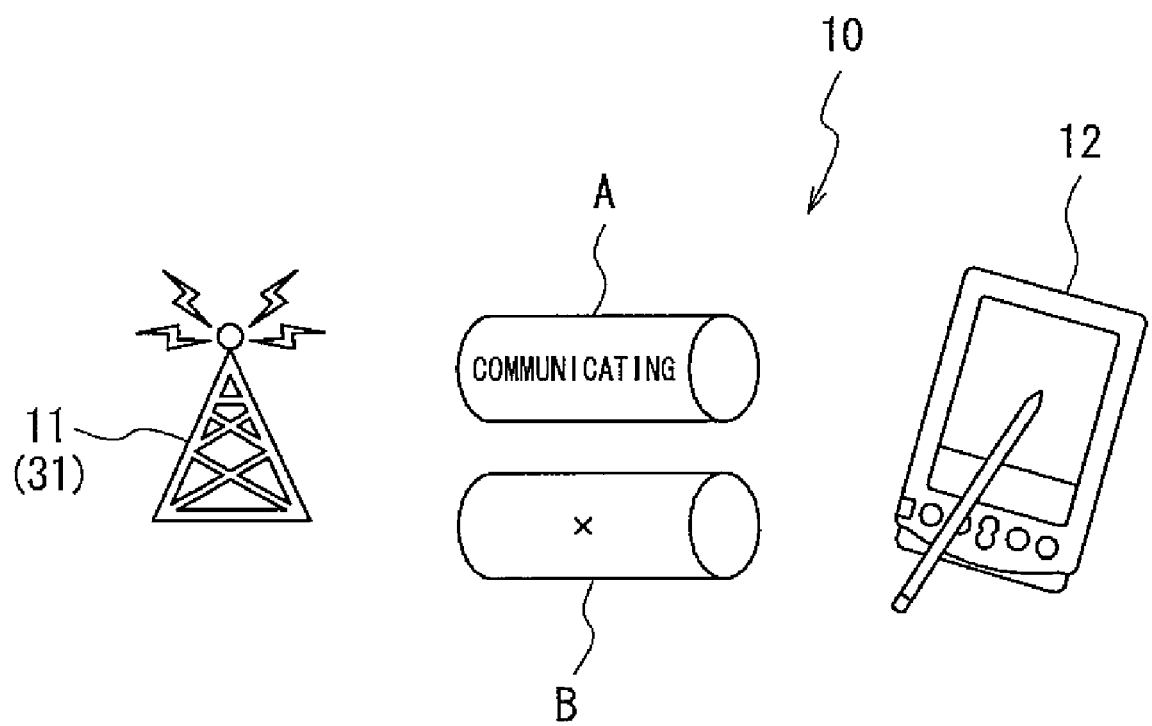
FIG. 1 is a concept diagram of a communication system in accordance with an embodiment of the present invention.

Shown in FIG. 1 is a concept diagram of a communication system of an embodiment in accordance with the present invention. As shown in FIG. 1, a communication system 10 is capable of communicating between a base station apparatus (Base Station: BS) 11 (31) and a mobile terminal apparatus (Mobile Station: MS) 12 serving as a communication terminal apparatus with a plurality of sessions (a first session A and a second session B are shown as an example in FIG. 1).

The communication system 10 corresponds to WiMAX (Worldwide interoperability for Microwave Access), a new standard, for a high-speed wireless data communication (wireless broadband) defined by IEEE802.16 Committee. For IEEE802.16-2005, a sleep mode is defined for the mobile terminal apparatus to save power by tuning on/off power supply of a wireless circuit unit intermittently. For example, the first session A is in an active mode (communicating), in which a connection is established between the BS 11 and the MS 12, while the second session B is in a sleep mode (x) in which no connection is established (see FIG. 1).

Figure 2:
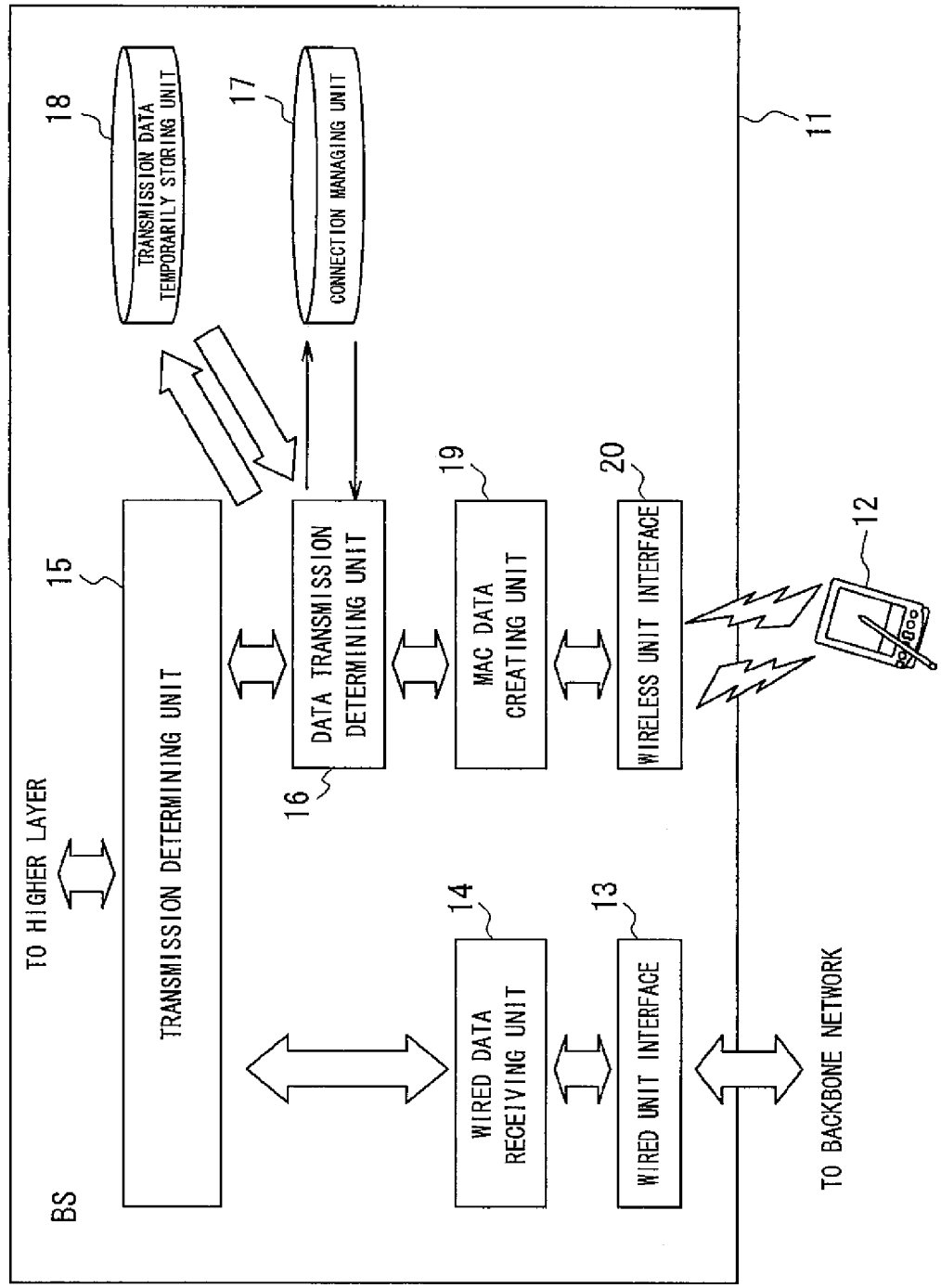
FIG. 2 is a block diagram illustrating a configuration of a base station apparatus used for the communication system in accordance with a first embodiment.

Shown in FIG. 2 is a block diagram illustrating a configuration of the base station apparatus used for the communication system in accordance with a first embodiment of the present invention. As shown in FIG. 2, the BS 11 is provided with a wired unit interface 13, a wired data receiving unit 14, a transmission determining unit 15, a data transmission determining unit 16, a connection managing unit 17, a transmission data temporarily storing unit 18, a MAC (Media Access Code) data creating unit (data transmitting unit) 19, and a wireless unit interface 20.

The wired unit interface 13 serves as a physical interface with a wired network (such as Ethernet (TM), for example) and is connected to a backbone network. The wired data receiving unit 14 transmits and receives packets with the wired unit interface 13. The wired unit interface 13 and the wired data receiving unit 14 serve as a data obtaining unit for obtaining data for the first session from the network.

The transmission determining unit 15 determines which one of the own apparatus (BS 11) or the MS 12 the packet transmitted from the wired data receiving unit 14 is addressed to and processes the packet when the packet is addressed to its own apparatus while transfers the packet to the data transmission determining unit 16 when the packet is addressed to the MS 12. The transmission determining unit 15 is connected to a higher layer The data transmission determining unit 16 determines whether connection with the MS 12 to which the data are to be transmitted is established, and manages communication with the MS 12. The data transmission determining unit 16 also determines whether the connection is in the sleep state or in the active state and stores the state of the connection in a connection managing unit 17. In addition, the data transmission determining unit 16 searches a connection suitable for transmitting data from information on the connection with the MS 12 and instructs to transmit MOB_TRF-IND (Mobile Traffic Indication) management message to all MSs 12 from a broadcast connection.

That is, the data transmission determining unit 16 serves as a session state recognizing unit for recognizing states of connections with the MS 12 established in the first session and the second session, and also as an instructing unit for giving an instruction (a request) to the MS 12 to change a state of the first session via the second session when the wired unit interface 13 and the wired data receiving unit 14 receive data for the first session while the first session (connection) is in the sleep state and the second session (connection) is in the active state according to the recognition.

The connection managing unit 17 manages the stored information on the connection and monitors whether the connection is in the sleep state or in the active state by means of a timer provided thereto.

The transmission data temporarily storing unit 18 stores data temporarily when there is no data to be transmitted.

The MAC data creating unit 19 handles data to be transmitted based on data transmitted from the data transmission determining unit 16 and information on the connection to which the data is to be transmitted in the following steps: generating a MAC message by itself, adding the MAC message to data addressed to a searched connection, and storing the data in the transmission data temporarily storing unit 18 until recovery of the connection (session) with the MS 12.

The MAC data creating unit 19, in addition, creates the MOB_TRF-IND management message addressed to the MS 12. Namely, the MAC data creating unit 19 transmits data for the first session to the MS 12 via the first session changed to be in the active state.

The wireless unit interface 20 serves as an interface with the wireless network (IEEE802.16). The wireless unit interface 20 transmits a packet created by the MAC data creating unit 19 to the MS 12 in accordance with a physical format of a packet to be transmitted.

Figure 3:
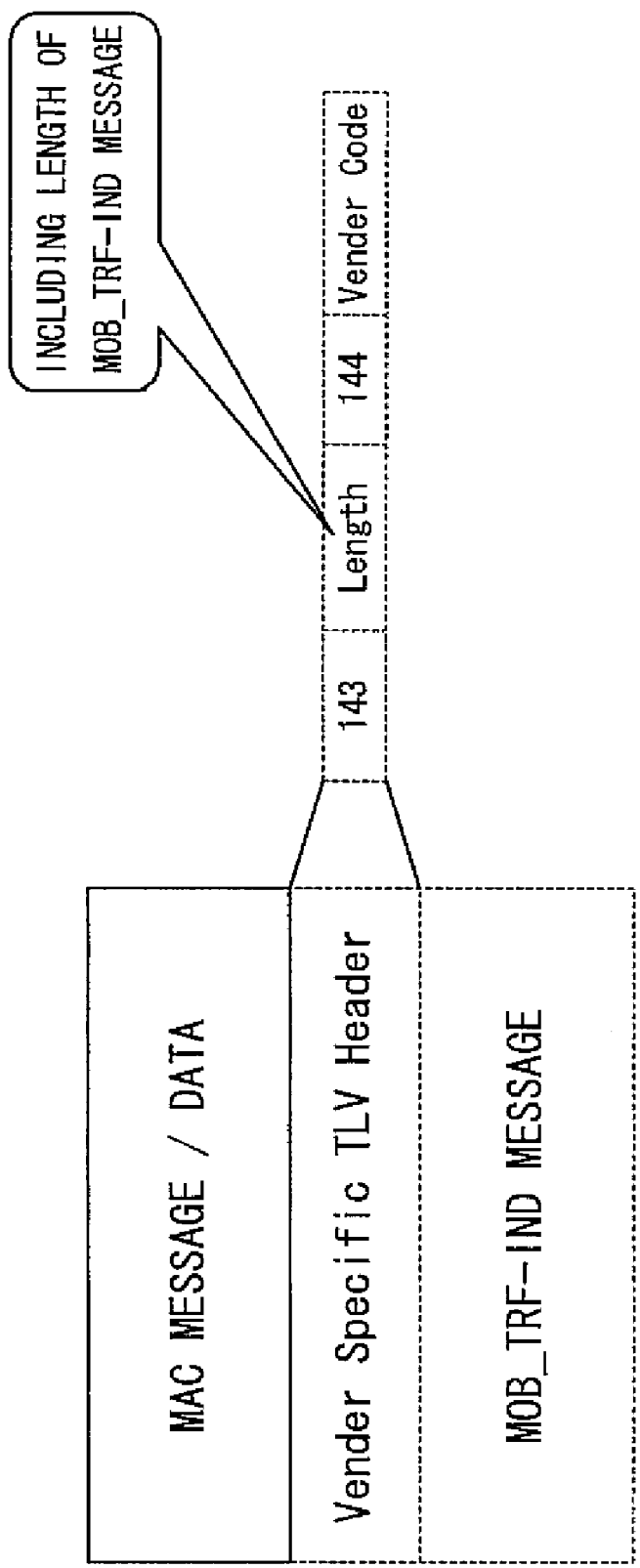
FIG. 3 is an explanatory diagram illustrating a configuration of a packet created by a MAC data creating unit.

Shown in FIG. 3 is an explanatory diagram illustrating a configuration of a packet created by the MAC data creating unit 19. As shown in FIG. 3, the MAC data creating unit 19 creates the packet by an adding method using TLV (Type-Length-Value) and encapsulates the MOB_TRF-IND message in Vender Specific TLV Header to the back of the MAC message and the data.

That is, the MAC data creating unit 19 adds Vender Specific TLV and MOB_TRF-IND message in relation to a session to be instructed to recover to the data flowing in the active session. Vender Specific TLV is defined by Standard (IEEE802.16-2004). Since the MS 12 ignores not understandable message, it causes no trouble in connection between other venders and apparatuses.

Figure 4:
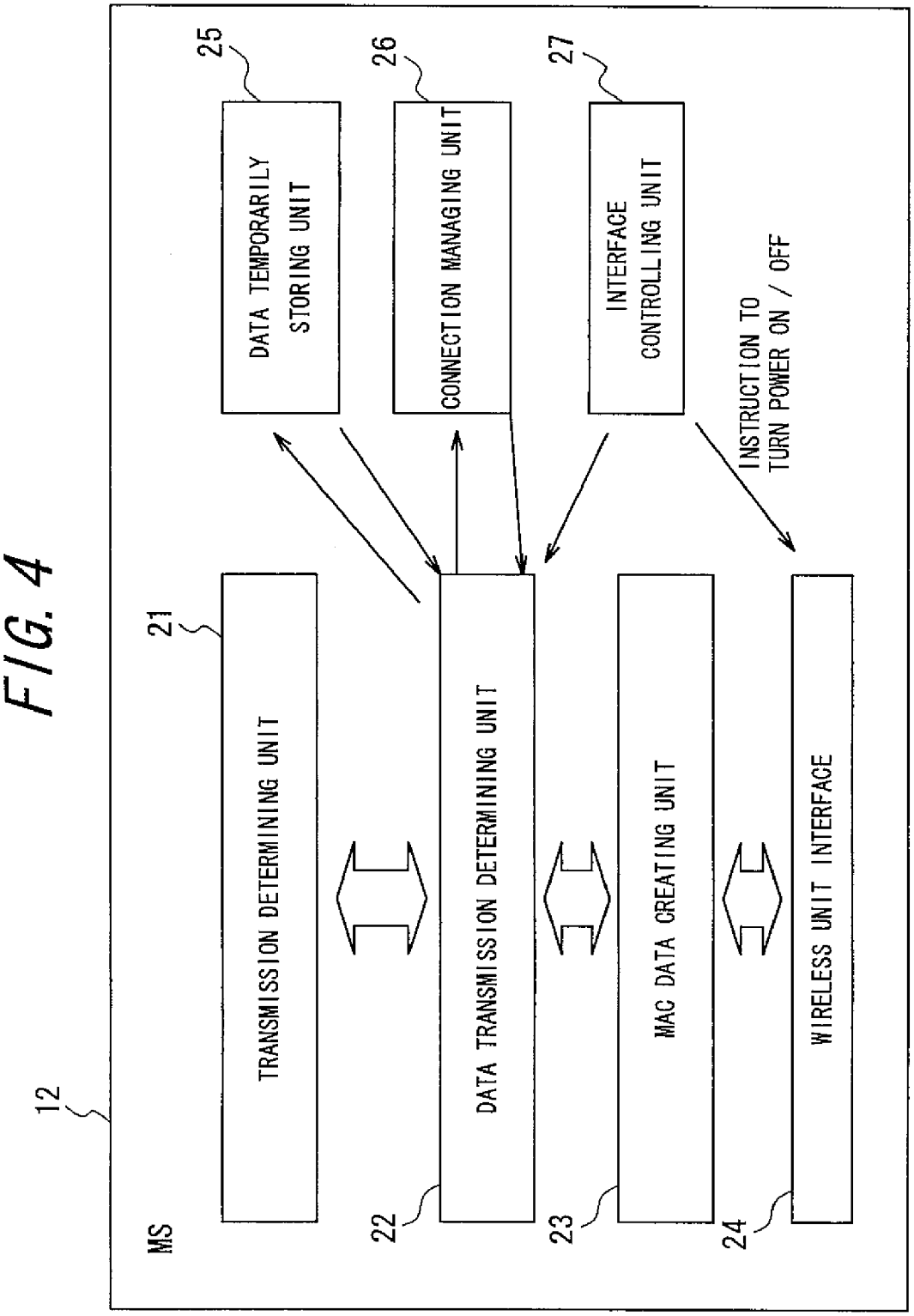
FIG. 4 is a block diagram illustrating a configuration of a mobile terminal apparatus of FIG. 1.

Shown in FIG. 4 is a block diagram illustrating a configuration of the mobile terminal apparatus used for the communication system in accordance with the first embodiment. As shown in FIG. 4, the MS 12 is provided with a transmission determining unit 21, a data transmission determining unit 22, a MAC data creating unit 23, a wireless unit interface 24, a data temporarily storing unit 25, a connection managing unit 26, and an interface controlling unit (a control unit) 27.

The data transmission determining unit 22 determines whether the connection is established with the BS 11, to which data are to be transmitted, and manages communication with the BS11. Moreover, the data transmission determining unit 22 determines whether the connection is in the sleep state or in the active state, and stores the state of the connection in the connection managing unit 26. When data to be transmitted uses the connection in the sleep state, the data transmission determining unit 22 stores the data to be transmitted in the data temporarily storing unit 25 until the connection is activated.

When receiving MOB_TRF-IND management message, the data transmission determining unit 22 searches whether the connection to be used for transmission is in the sleep state based on the state of connection stored in the connection managing unit 26. When receiving an active instruction from the connection managing unit 26, the data transmission determining unit 22 recovers the connection. In other words, the connection which receives MOB_TRF-IND management message active instruction is recovered.

The MAC data creating unit 23 creates a MAC message based on data transmitted from the data transmission determining unit 22 and information on the connection to which the data is to be transmitted.

The wireless unit interface 24 serves as an interface with the wireless network (IEEE802.16). The wireless unit interface 24 transmits a packet created by the MAC data creating unit 23 to the BS 11 in accordance with the physical format of the packet to be transmitted.

The data temporality storing unit 25 stores data temporarily when there is no data to be transmitted.

The connection managing unit 26 manages the stored information on the connection and monitors whether the connection is in the sleep state or in the active state by means of a timer provided thereto.

The interface controlling unit 27 controls states of the sessions so that the first session has a period in which the first session is shifted to the active state or the sleep state (inactive state) alternately at predetermined time intervals (an intermittent receiving mode) and that the second session has a period in which the second session is at least in the active state when the first session is in the sleep state. In addition, when being instructed to change a state of the first session by the data transmission determining unit 16 of the BS 11, the interface controlling unit 27 controls the state of the first session to be changed to the active state based on the instruction even before a lapse of the predetermined time interval.

Next, an explanation of a communication method of the communication system in accordance with the first embodiment is given.

First, the data transmission determining unit 16 of the BS 11 determines whether the connection is in the sleep state or in the active state. The data transmission determining unit 16 analyzes a sleep declaration from the MS 12 and a sleep instruction from the BS 11 and stores the information on the connection in the connection managing unit 17. The connection managing unit 17 counts the designated period of time with the timer and, when the timer runs out, notifies the data transmission determining unit 16 of the connection changed to be in a different state.

Next, when the transmission data arrives at the BS 11 via the wired unit interface 13, the wired data receiving unit 14 transforms the data into packets. The transmission determining unit IS searches a transmitting address of the packet and determines whether the packet is addressed to the BS 11 or the MS 12. The transmission determining unit 15 transfers the packet to the higher layer when determining that the packet is addressed to the BS 11, while transfers the packet to the data transmission determining unit 16 when determining that the packet is addressed to the MS 12.

The data transmission determining unit 16 determines whether the connection is established from a destination of the packet based on where the packet is addressed to. The data transmission determining unit 16 checks whether the connection is in the active state or in the sleep state from the connection managing unit 17, and transmits the data when the connection is in the active state, while transmits MOB_TRF-IND message to the connection when the connection is in the sleep mode and the MS 12 is in the state of Listen waiting only to receive MOB_TRF-IND message. When receiving MOB_TRF-IND message, the MS 12 recovers the connection from the sleep state to the active state so as to receive the data.

On the other hand, when the connection is in the sleep mode, the data transmission determining unit 16 transmits MOB_TRF-IND message to a broadcast connection and searches for an active connection with the MS 12 based on information stored in the connection managing unit 17. When there is an active connection, the data transmission determining unit 16 extracts data for the connection and adds MOB_TRF-IND message encapsulated by TLV to the back of the data. The data to be transmitted is stored in the transmission data temporarily storing unit 18.

After waiting for the MS 12 to which MOB_TRF-IND message is transmitted to turn to be in the active state, the data transmission determining unit 16 extracts the data saved in the transmission data temporarily storing unit 18 and transmits the data to the MAC data creating unit 19.

The MAC data creating unit 19 converts the data and the MAC message into a MAC format and transmits to the wireless unit interface 20. The wireless unit interface 20 converts the packet into a wireless form and transmits to the MS 12.

In the MS 12, each unit manages the connection and transmits data in a similar way stated above, except for notifying the interface controlling unit 27 when the data transmission determining unit 22 determines whether the connection is in the sleep state or the active state. When being notified, the interface controlling unit 27 searches and activates the connection.

Next, a case in which the MS 12 receives MOB_TRF-IND message is described.

When MOB_TRF-IND message encapsulated by TLV arrives at the MS 12 through an active connection, the data transmission determining unit 22 analyzes the structure of TLV and extracts MOB_TRF-IND message and then searches for information on a connection to which an active instruction is given from the connection managing unit 26.

Figure 5:
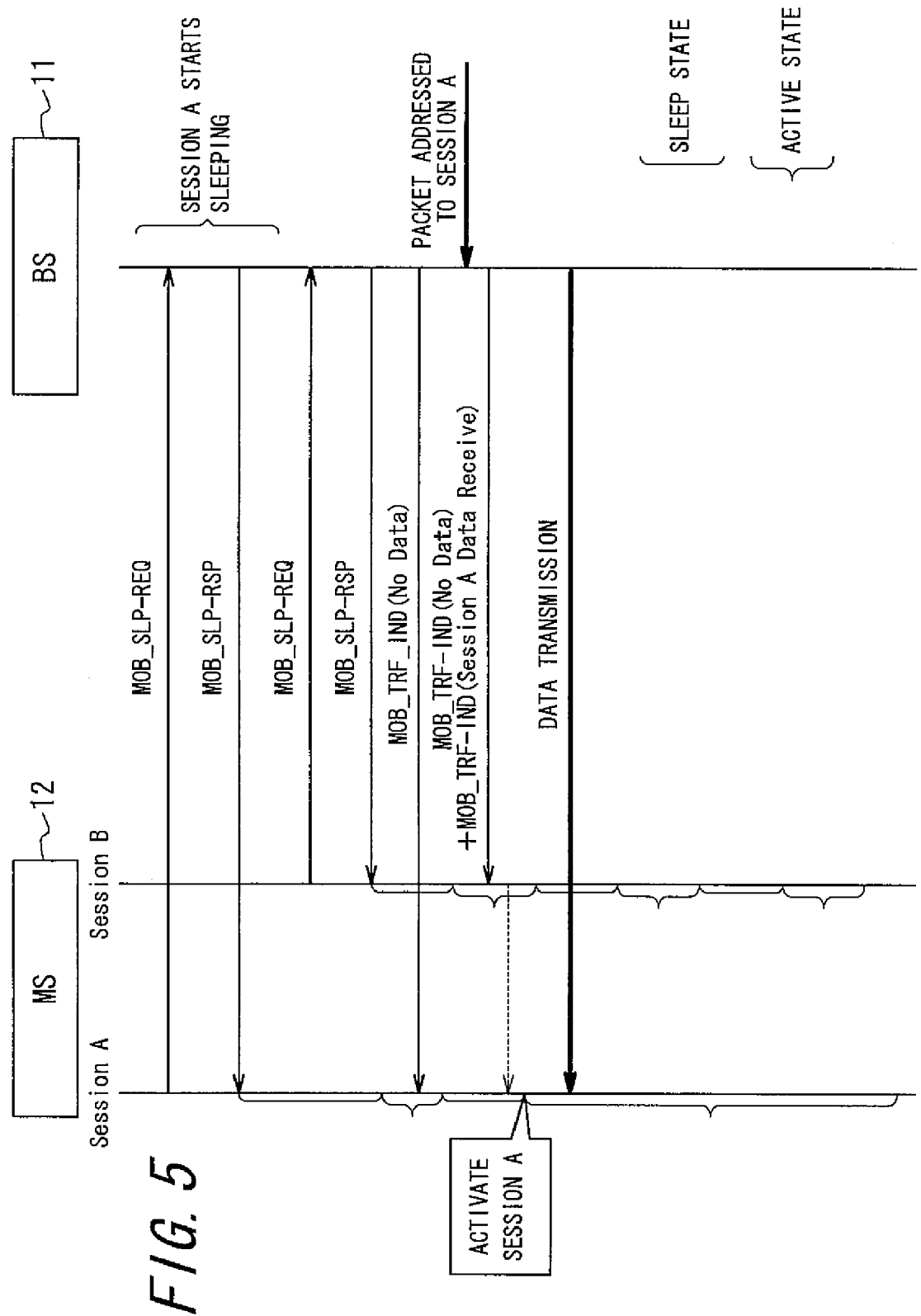
FIG. 5 is a sequence diagram illustrating data transmission by a communication method of the communication system in accordance with the first embodiment.

Shown in FIG. 5 is a sequence diagram illustrating data transmission by a communication method of the communication system in accordance with the first embodiment. As shown in FIG. 5, the MS 12 outputs a sleep request signal (MOB_SLP-REQ) from the session A to the BS 11 and, when receiving the sleep request signal, the BS 11 outputs a sleep response signal (MOB_SLP-RSP) to the session A, the session A thereby starts sleep and turns to be in the sleep state. After a lapse of the predetermined period, the session A turns to be in the active state and then repeats the sleep state and the active state alternately.

On the other hand, the session B of the MS 12, like the session A, repeats the sleep state and the active state alternately so that the session B turns to be in the active state when the session A is in the sleep state and turns to be in the sleep state when the session A is in the active state.

Then, when the BS11 obtains data for the session A (packet addressed to the session A) from the network when the session A is in the active state, the BS 11 outputs MOB_TRF-IND (No Data) to the session A which is in the active state.

In the case where the BS11 obtains the data for the session A (the packet addressed to the session A) from the network when the session A is in the sleep state, the BS 11 outputs an instruction (MOB_TRF-IND (No Data)+MOB_TRF-IND (Session A Data Receive)) to change the state of the session A to the MS 12 via the session B which is in the active state. When the instruction to change the state of the session A is inputted to the MS 12, the MS 12 outputs an active instruction to the session A which is in the sleep state and activates the session A. Since the session A which has been in the sleep state is changed to be in the active state, the BS 11 transmits the data for the session A obtained from the network to the session A.

As set forth above, the first session of the communication system 10 in accordance with the first embodiment has the period (intermittent receiving mode) in which the first session is shifted to the active state or the sleep state (inactive state) alternately at predetermined time intervals and the second session has the period in which the second session is at least in the active state when the first session is in the sleep state. In the communication system 10, communication is performed through the following steps: a session state recognizing step at which the BS 11 recognizes states of the first session and the second session; an instructing step at which, based on the recognition, the BS 11 gives an instruction (request) to change a state of the first session to the MS 12 via the second session when data for the first session are obtained from the network (backbone network) while the first session is in the sleep state and the second session is in the active state; a session state changing step at which the MS 12 changes the first session to be in the active state when receiving the instruction even before a lapse of the predetermined time interval; and a data transmitting step at which the BS 11 transmits the data for the first session to the MS 12 via the first session changed to be in the active state. It may thus reduce the burden on the base station apparatus to hold the data.

It is to be noted that the data for the first session obtained from the network may be data for a realtime communication at the instructing step. It may thus enhance speed-up of communication requiring realtime communication (such as an emergency communication and the likes).

Moreover, the second session has the period (intermittent receiving mode) in which the second session is shifted to the active state or the sleep state alternately at predetermined time intervals, and the states of the first session and the second session to be either in the active state or in the sleep state are recognized in the session state recognizing step. It may thus enable to deal with a case in which the session A and the session B are in the intermittent receiving mode.

In the communication system of the conventional art, when a base station apparatus attempts to transmit data to a certain mobile terminal apparatus but the connection is dormant due to the sleep mode, the base station apparatus stores the data temporarily until the recovery of the connection or discards the data if there is no buffer space available. However, in the communication system of the present invention, when a plurality of connections are established between the base station apparatus and the mobile terminal apparatus but a certain connection is dormant, the base station apparatus gives an instruction to recover the connection via another connection. When receiving the instruction, the mobile terminal apparatus immediately recovers the connection to start receiving the data. The base station apparatus can thereby transmit data promptly with less data to be stored temporarily.

That is, in the communication system of the conventional art, the time to sleep is counted by a counter called Window Size, and the mobile terminal apparatus also recovers a connection when the Window Size is reduced to "0" by the base station apparatus. When having received data to be transmitted to the connection, the base station apparatus transmits MOB_TRF-IND message in which a Positive Indication bit is set to the mobile terminal apparatus via the recovered connection. When receiving the message, the mobile terminal apparatus stops the counter of the Window Size counting the time to sleep and leaves the power supply ON for a while. MOB_TRF-IND message is supposed to be transmitted as a broadcast message from the base station apparatus.

Since the mobile terminal apparatus can not necessarily obtain broadcast data, MOB_TRF-IND message is transmitted to the mobile terminal apparatus through a connection with which data can be transmitted unfailingly.

As a result, transmission delay of the data in the base station can be prevented as much as possible by quick recovery of the connection, in consideration of some connections having an attribute transmitting realtime data.

As set forth above, the base station apparatus does not wait for the connection to become in the active state to transmit MOB_TRF-IND message, which is a recovery instruction, but transmits MOB_TRF-IND message by use of TLV (Type-Length-Value) as long as there is at least one connection communicating with the mobile terminal apparatus. The base station apparatus then transmits MOB_TRF-IND message via another connection by attaching the message to data or the management message of the connection. MOB_TRF-IND message is encapsulated by TLV of 11.1.6 Vendor-specific information defined by IEEE802.16-2004 standard and embedded in other data.

Figure 6:
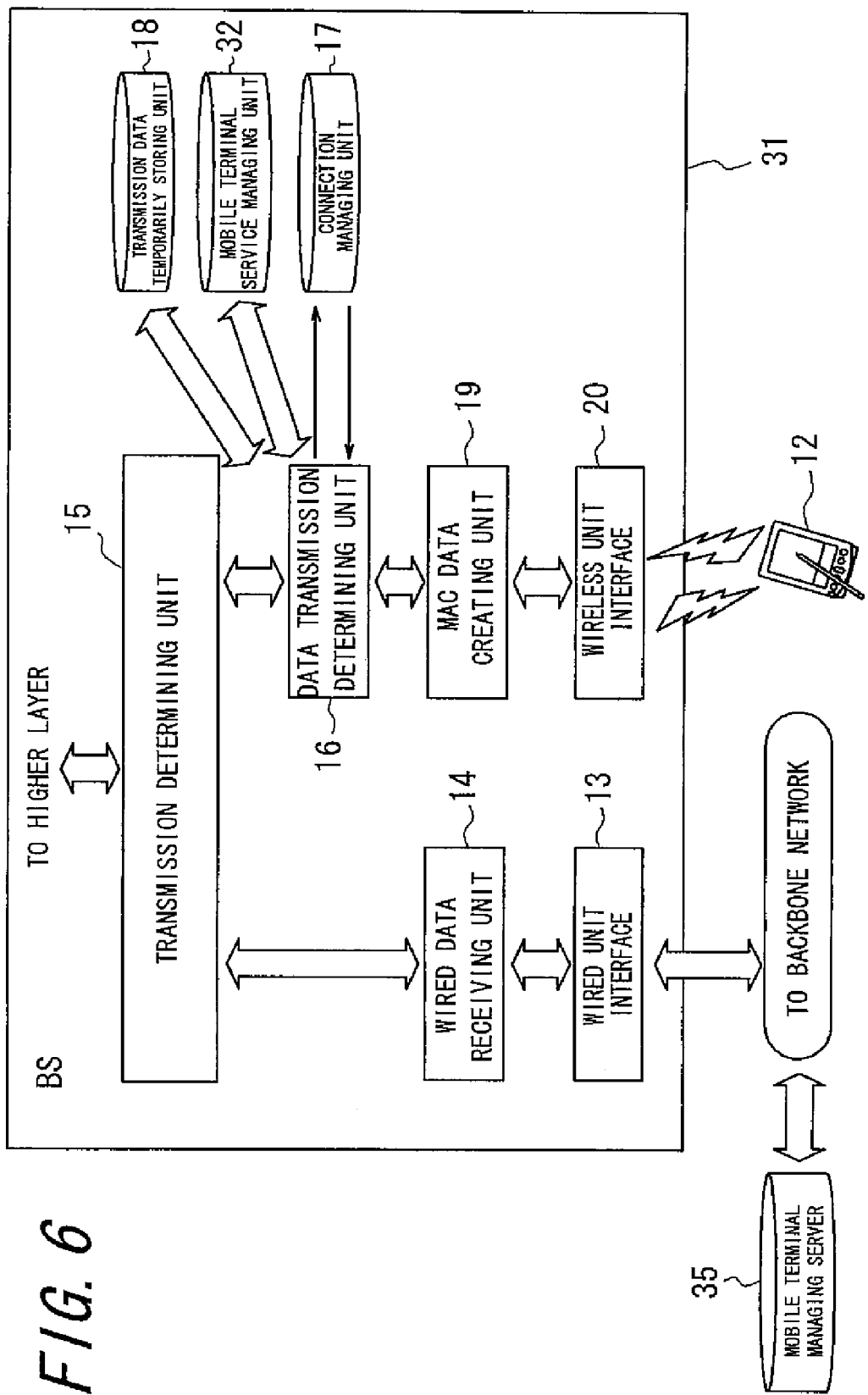
FIG. 6 is a block diagram illustrating a configuration of a base station apparatus used for the communication system in accordance with a second embodiment.

Next an explanation of a communication system in accordance with a second embodiment of the present invention is given. Shown in FIG. 6 is a block diagram illustrating a configuration of a base station apparatus used for the communication system in accordance with the second embodiment of the present invention. As shown in FIG. 6, a BS 31 is provided with a wired unit interface 13, a wired data receiving unit 14, a transmission determining unit 15, a data transmission determining unit 16, a connection managing unit 17, a transmission data temporarily storing unit 18, a MAC data creating unit (data transmitting unit) 19, a wireless unit interface 20, and a mobile terminal service managing unit 32.

The BS 31 shown in FIG. 6 differs from the BS 11 shown in FIG. 12 in having the mobile terminal service managing unit 32 and connecting the wired unit interface 13 to a mobile terminal managing server 35 via the backbone network. The mobile terminal managing server 35 manages information on authentication and service type of the MS 12. Following is a description of units in the BS 31 different from those in the BS 11.

The mobile terminal service managing unit 32 stores information on the service type of the mobile terminal apparatus (MS) 12.

In addition to the function set forth above with regard to the BS 11 shown in FIG. 2, the data transmission determining unit 16 has following functions as described as follows. When communication with the MS 12 is started, the data transmission determining unit 16 creates packets to obtain information on the service type of the MS 12 from the mobile terminal managing server 35. When obtaining the information on the service type of the MS 12 from the mobile terminal managing server 35, the data transmission determining unit 16 stores the information on the service type in the mobile terminal service managing unit 32. Furthermore, when data transmission is performed, the data transmission determining unit 16 retrieves the information on the service type of the MS 12 from the mobile terminal service managing unit 32 and determines whether to process the information immediately or to wait for a while, and in the case of wait for a while, the data transmission determining unit 16 stores the data in the transmission data temporarily storing unit 18.

That is, the data transmission determining unit 16 functions as a priority recognizing unit for recognizing priorities of the first session and the third session when the wired unit interface 13 and the wired data receiving unit 14, which are serving as the data obtaining unit, obtain at least data for the third session different from the first session and the second session together with data for the first session from the network, as a priority comparing unit to compare the priority of each of the sessions recognized, and as a controlling unit to control so as to transmit the data for the third session preferentially via the third session when higher priority is placed on the third session as a result of the comparison.

Since the configuration of the mobile terminal apparatus (MS) used for the communication system in accordance with the second embodiment is the same as that of the first embodiment, explanation of each of the units is omitted.

Next explanations of a communication method of the communication system in accordance with the second embodiment are given.

First, when the BS 31 receives a communication start request from the MS 12, the data transmission determining unit 16 transmits a packet notifying a MAC address, for instance, which uniquely distinguishes the MS 12 to the mobile terminal managing server 35 in order to obtain the information on the service type of the MS 12. The mobile terminal managing server 35 sends back the service type of the MS 12 from the information notified. The data transmission determining unit 16 stores the information on the service type in the mobile terminal service managing unit 32.

The process until the data transmission determining unit 16 obtains data arrived at the wired unit interface 13 is the same as that of the first embodiment.

Here is a case in which data for the first mobile terminal apparatus (MS) 12-1 and data for the second mobile terminal apparatus (MS) 12-2 having different service types from each other, simultaneously arrive at the wired unit interface 13 from the backbone network. In this case, it is assumed that priority is placed on the service type of the MS 12-2 over that of the MS 12-1. When receiving the data, the data transmission determining unit 16 retrieves service types of the MS 12-1 and the MS 12-2 from the mobile terminal service managing unit 32. Since the service type of the MS 12-2 has higher priority, the data transmission determining unit 16 recognizes that the session of the MS 12-2 has higher priority than the session of MS 12-1. In order to assign a wireless resource preferentially to the session of the MS 12-2, the data transmission determining unit 16 stores the data addressed to the session of the MS12-1 temporarily in the transmission data temporarily storing unit 18 and transfers the data addressed to the session of the MS 12-2 to the MAC data creating unit 19.

Next, when it is time to be able to transmit data to the session of the MS 12-1 and the session of the MS 12-1 is in the active state, the data transmission determining unit 16 extracts the data addressed to the session of the MS 12-1 from the transmission data temporarily storing unit 18 and transfers the data to the MAC data creating unit 19. If the session of the MS 12-1 is in the sleep state, the data transmission determining unit 16 notifies another session of the MS 12-1 that the session of the MS 12-1 will become active, and then extracts the data addressed to the session of the MS 12-1 from the transmission data temporarily storing unit 18 and transfers the data to the MAC data creating unit 19 when it is time to transmit the data.

Shown in FIG. 7 is a sequence diagram illustrating data transmission by the communication method of the communication system in accordance with the second embodiment. As shown in FIG. 7, the MS 12-1 outputs a sleep request signal (MOB_SLP-REQ) from the session A (first session) to the BS 31 and, in response to it, the BS 31 outputs a sleep response signal (MOB_SLP-RSP) to the session A. Thereby the session A starts sleep and turns to be in the sleep state. After a lapse of a predetermined period, the session A turns to be in the active state and then repeats the sleep state and the active state alternately.

On the other hand, like the session A, the session B (second session) of the MS 12-1 repeats the active state and the sleep state alternately so as to be in the active state when the session A is in the sleep state and to be in the sleep state when the session A is in the active state.

When obtaining data for the session A (packet addressed to the session A) from the network while the session A is in the active state, the BS 31 outputs MOB_TRF-IND (No Data) to the session A which is in the active state.

Here, when the BS 31 obtains data for the session A (packet addressed to the session A) and data for the session C (packet addressed to the session C) simultaneously from the network while the session A of the MS 12-1 is in the sleep state and the session C (third session) of the MS 12-2 is in the active state, the data transmission determining unit 16 of the BS 31 retrieves service types of the MS 12-1 and the MS 12-2 from the mobile terminal service managing unit 32. When higher priority is placed on the service type of the MS 12-2 over that of the MS 12-1, it means that the session C has higher priority over the session A, therefore the BS 31 stores the data addressed to the session A temporarily in the transmission data temporarily storing unit 18 and transmits the data addressed to the session C to the MS 12-2.

Next, in a case in which the session A is in the sleep state when it is time to be able to send data to the session A after completion of the transmission of the data addressed to the session C, the BS 31 outputs an instruction (MOB_TRF-IND (No Data)+MOB_TRF-IND (Session A Data Receive)) to change the state of the session A to the session B of the MS 12-1 which is in the active state. When the instruction to change the state of the session A is input in the MS 12-1 via the session B, the MS 12-1 outputs an active instruction to the session A which is in the sleep state to activate the session A.

When the session A turns to be in the active state from in the sleep state, the BS 31 transmits the data for the session A stored in the transmission data temporarily storing unit 18 to the session A.

It is to be noted that, although the session C is the session for MS12-2 to communicate with BS31 as shown in FIG. 7, the session C may be the session for MS12-1 to communicate with BS31.

Moreover, although the BS 31 obtains the information on the service type of the MS 12 from the mobile terminal managing server 35, the BS 31 may obtain the information on the service type of the MS 12 by itself from information included in data transmitted by the MS 12 to require the start of the session without requesting the information to the mobile terminal managing server 35.

As set forth above, in the communication system 10 in accordance with the second embodiment, the data for the third session are transmitted through the following steps: a priority recognizing step to recognize priorities of the first session and the third session when the BS 31 obtains at least data for the first session and data for the third session different from the first session and the second session; a priority comparing step to compare the priorities of each of the sessions recognized; a controlling step to control so as to transmit the data for the third session preferentially via the third session when higher priority is placed on the third session as a result of the comparison.

Furthermore, the first session has a period (intermittent receiving mode) in which the first session is shifted to the active state or the sleep (inactive) state alternately at predetermined time intervals and the second session has a period in which the second session is at least to be in the active state when the first session is in the sleep state. And the communication is performed in the communication system 10 through the following steps; the session state recognizing step at which the BS 31 recognizes states of the first session and the second session; the instructing (requesting) step at which the BS 31 gives an instruction to change the state of the first session to the MS 12 via the second session when the BS 31 obtains data for the first session from the network (backbone network) while the first session is in the sleep state and the second session is in the active state based on the recognition; the session state changing step at which the MS 12 changes the first session to be in the active state when receiving the instruction even before a lapse of the predetermined time interval; and the data transmitting step at which the BS 31 transmits the data for the first session to the MS 12 via the first session changed to be in the active state.

In the communication system in accordance with the second embodiment, the base station apparatus can reduce the burden on the CPU of the base station apparatus by changing a transmission order of packets for each mobile terminal apparatuses based on information on the service types of the mobile terminal apparatus obtained from the mobile terminal managing server.

That is, the base station apparatus can communicate stably with a mobile terminal apparatus of higher service type by communicating with the mobile terminal managing server to obtain the service type of the mobile terminal apparatus and changing the transmission order of packets for each mobile terminal apparatus when substantially simultaneously receiving the packets addressed to two sessions of different service types, and by stopping temporarily transmission of a packet addressed to a session of lower priority and storing the packet temporarily when the base terminal apparatus is short of the resources Furthermore, in a case in which the base station apparatus attempts to transmit a packet to a session of lower priority and the session is dormant in the sleep mode, the base station apparatus instructs the mobile terminal apparatus via another session to recover the session. When receiving the instruction, the mobile terminal apparatus immediately recovers the session and starts receiving data. The base station apparatus can thereby transmit the data promptly with less data to be stored temporarily in the base station apparatus.

Although the present invention has been described by use of the embodiments set forth above, it is to be noted that the present invention is not limited to the embodiments and therefore covers modified embodiments not departing from the spirit of the present invention.

The invention claimed is:

1. A communication method of a communication system communicating between a communication terminal apparatus and a base station apparatus at least in a first session and a second session, wherein the first session is a direct communication connection between the communication terminal apparatus and the base station apparatus over a first communication protocol and the second session is another direct communication connection between the communication terminal apparatus and the base station apparatus over the first communication protocol, and the first session has a period in which the first session is shifted alternately between an active state and a sleep state at predetermined time intervals, wherein the second session has a period in which the second session is at least in the active state when the first session is in the sleep state, the communication method comprising:

a session state recognizing step at which the base station apparatus recognizes the states of the first session and the second session;

an instructing step at which the base station apparatus gives an instruction to the communication terminal apparatus to change the sleep state of the first session to the active state via the second session when the base station apparatus obtains first session data to be transmitted via the first session from a network while the first session is in the sleep state and the second session is in the active state based on the recognition;

a session state changing step at which the communication terminal apparatus changes the first session to be in the active state from the sleep state when receiving the instruction even before a lapse of the predetermined time interval; and a data transmitting step at which the base station apparatus transmits the first session data to the communication terminal apparatus via the active state first session changed from the sleep state.

2. The communication method according to claim 1, wherein the base station apparatus gives the instruction to the communication terminal apparatus to change the state of the first session via the second session in the instructing step when obtaining first session data from the network, wherein the first session data is communicated in realtime.

3. The communication method according to claim 1, wherein the second session has a period in which the second session is shifted alternately between the active state and a sleep state at predetermined time intervals, and
the base station apparatus recognizes the states of the first session and the second session either in the active state or in the sleep state in the session state recognizing step.

4. The communication method according to claim 1, further comprising:
a priority recognizing step at which the base station apparatus recognizes priorities of the first session and a third session when obtaining at least first session data and third session data different from the first session and the second session;
a priority comparing step at which the base station apparatus compares each of the recognized priorities; and
a controlling step at which the base station apparatus controls so as to transmit the third session data preferentially via the third session when higher priority is placed on the third session as a result of the comparison, wherein
the steps subsequent to the session state recognizing step are executed after transmission of the third session data.

5. The communication method according to claim 4, wherein when communication terminal apparatuses communicating in the first session and in the third session are different from each other,
the base station apparatus recognizes priority of the communication terminal apparatus communicating in each session in the priority recognizing step, and
the base station apparatus controls so as to transmit the third session data preferentially via the third session in the controlling step when the priority is placed on the communication terminal apparatus communicating in the third session as a result of comparison in the priority comparing step.

6. A communication system communicating between a communication terminal apparatus and a base station apparatus at least in a first session and a second session, wherein
the first session is a direct communication connection between the communication terminal apparatus and the base station apparatus over a first communication protocol and the second session is another direct communication connection between the communication terminal apparatus and the base station apparatus over the first communication protocol, and
the communication terminal apparatus comprises:
a controlling unit controlling session states so that the first session has a period in which the first session is shifted alternately between an active state and a sleep state at predetermined time intervals, wherein the second session has a period in which the second session is at least in the active state when the first session is in the sleep state,
the base station apparatus comprises:
a session state recognizing unit recognizing states of the first session and the second session;

a data obtaining unit obtaining first session data from a network to be transmitted via the first session; and
an instructing unit giving an instruction to the communication terminal apparatus to change the state of the first session via the second session when first session data is obtained by the data obtaining unit while the first session is in the sleep state and the second session is in the active state based on recognition by the session state recognizing unit,
the controlling unit of the communication terminal apparatus controls the state of the first session to be changed to the active state from the sleep state based on the instruction even before a lapse of the predetermined time interval, and
the base station apparatus further comprises a data transmitting unit transmitting the first session data via the active state first session changed from the sleep state.

7. The communication system according to claim 6, wherein the base station apparatus further comprising:
a priority recognizing unit for recognizing priorities of the first session and a third session when at least third session data different from the first session and the second session are obtained together with first session data from a network by the data obtaining unit;
a priority comparing unit comparing priority of each session recognized; and
a controlling unit controlling so as to transmit the third session data preferentially via the third session when the priority is placed on the third session as a result of the comparison.

8. A communication terminal apparatus communicating with a base station apparatus at least in a first session and a second session comprising:
a controlling unit controlling session states so that the first session has a period in which the first session is alternately shifted between an active state and a sleep state at predetermined time intervals, wherein the second session has a period in which the second session is at least in the active state when the first session is in the sleep state; and
an instruction obtaining unit obtaining an instruction indicating a message to change the sleep state of the first session to the active state from the base station apparatus via the second session when the first session is in the sleep state and the second session is in the active state, wherein
the first session is a direct communication connection between the communication terminal apparatus and the base station apparatus over a first communication protocol and the second session is another direct communication connection between the communication terminal apparatus and the base station apparatus over the first communication protocol, and
the controlling unit controls the state of the first session to be changed to the active state based on the instruction even before a lapse of the predetermined time interval.

9. A base station apparatus communicating with a communication terminal apparatus at least in a first session and a second session comprising:
a session state recognizing unit for recognizing states of the first session and the second session;
a data obtaining unit obtaining first session data from a network;
an instructing unit giving an instruction to the communication terminal apparatus to change the state of the first session via the second session when the first session data is obtained by the data obtaining unit while the first session is in a sleep state and the second session is in an active state based on the recognition by the session state recognizing unit; and a data transmitting unit transmitting the first session data to the communication terminal apparatus via the active state first session after the instruction, wherein the first session is a direct communication connection between the communication terminal apparatus and the base station apparatus over a first communication protocol and the second session is another direct communication connection between the communication terminal apparatus and the base station apparatus over the first communication protocol.

10. The base station apparatus according to claim 9, further comprising:

a priority recognizing unit recognizing priorities of the first session and a third session when the data obtaining unit obtains at least third session data different from the first session and the second session together with first session data from a network;

a priority comparing unit comparing each of the recognized priorities; and a controlling unit controlling so as to transmit the third session data preferentially via the third session when priority is placed on the third session as a result of the comparison.

* * * * *